United States Patent Office 3,076,845
Patented Feb. 5, 1963

3,076,845
RING-TRI-SUBSTITUTED-N-(LOWER - ALKANOYL) ANILINE DERIVATIVES AND PREPARATION THEREOF
Raymond O. Clinton and Donald F. Page, North Greenbush Township, N.Y., assignors to Sterling Drug Inc., New York, N.Y., a corporation of Delaware
No Drawing. Original application Aug. 29, 1956, Ser. No. 606,796. Divided and this application Oct. 27, 1958, Ser. No. 788,247
4 Claims. (Cl. 260—562)

This invention relates to compositions of matter of the class of ring-tri-substituted-N-(lower-alkanoyl)-analine derivatives and to their preparation. This application is a division of our co-pending United States patent application Serial No. 606,796, filed August 29, 1956, abandoned July 9, 1959, in favor of our continuation-in-part application Serial No. 823,784, filed July 3, 1959.

The invention here resides in a composition having a molecular structure in which a (lower-alkanoyl) amino substituent is attached to a benzene ring that is substituted further by lower-hydrocarbyloxy, halo and certain lower-tertiary-amino-(polycarbon-lower-alkoxy) radicals. The invention thus resides in a composition of matter selected from the group consisting of: (a) ring-tri-substituted-N-(lower-alkanoyl) anilines in which the substituents are, respectively, a halogen atom, a lower-hydrocarbyloxy radical, and a lower-tertiary-amino-substituted polycarbon-lower-alkoxy radical; and, (b) acid addition salts thereof.

Preferable halo - (lower-hydrocarbyloxy) - [lower-tertiary-amino(polycarbon-lower - alkoxy)] - N - (lower-alkanoyl) aniline derivatives in free base form have the Formula I

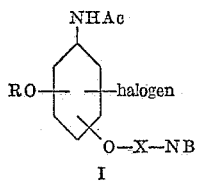

I where the halogen radical is bromo, chloro, iodo or fluoro, R is a lower-hydrocarbyl radical, X is a polycarbon-lower-alkylene radical having its free valence bonds on different carbon atoms, Ac is a lower-alkanoyl radical having from one to six carbon atoms inclusive and NB is a lower-tertiary-amino radical such as di-(lower-alkyl) amino, 1-piperidyl, (lower-alkylated)-1-piperidyl, 1-pyrrolidyl and (lower-alkylated)-1-pyrrolidyl radicals. The halo, lower-hydrocarbyloxy and lower-tertiary-amino-(polycarbon-lower-alkoxy) substituents can be in any of the available ring-positions relative to each other.

These compounds and their acid addition salt derivatives have high local anesthetic activity and low irritancies. In general, the acute toxicity of these compounds parallels their activity.

Particularly preferred embodiments of our invention are the 3-halo-4-[lower-tertiary-amino(polycarbon-lower-alkoxy)] - 5 - (lower-alkoxy)-N-(lower-alkanoyl) anilines having in free base form the Formula II

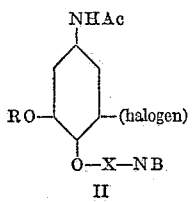

II where X, Ac and NB have the meanings designated above, halogen is bromo or chloro, and R is a lower-alkoxy radical.

In the above general Formula II the polycarbon-lower-alkylene radical designated as X has preferably from two to four carbon atoms and has its two free valence bonds on different carbon atoms. Thus, preferred embodiments for X include such groups as

—CH$_2$CH$_2$—,   —CH$_2$CH$_2$CH$_2$—

—CH$_2$CH(CH$_3$)

—CH$_2$CH$_2$CH$_2$CH$_2$—,   —CH$_2$CH(CH$_3$)CH$_2$— and the like. The lower-tertiary-amino radical shown above as NB comprehends di-(lower-alkyl)amino radicals where the lower-alkyl groups are alike or different and each alkyl group has preferably one to six carbon atoms, such di-(lower-alkyl)amino radicals including dimethylamino, diethylamino, ethylmethylamino, diisopropylamino, ethyl-n-propylamino, di-n-butylamino, di-n-hexylamino, and the like. Further, the lower-tertiary-amino radical designated as NB encompasses certain saturated N-heteromonocyclic radicals having five to six ring atoms, illustrated by examples such as 1-piperidyl; (lower-alkylated)-1-piperidyl such as 2-methyl-1-piperidyl, 2-ethyl-1-piperidyl), 4-methyl-1-piperidyl, 2,6-dimethyl-1-piperidyl; 1-pyrrolidyl; (lower-alkylated)-1-pyrrolidyl such as 2-methyl-1-pyrrolidyl, 2,5-dimethyl-1-pyrrolidyl; and the like. The lower-hydrocarbyl radical R when lower-alkyl has preferably one to eight carbon atoms and comprehends such radicals as methyl, ethyl, n-propyl, isopropyl, n-butyl, isobutyl, 2-butyl, n-amyl, isoamyl, 2-amyl, n-hexyl, n-heptyl, n-octyl, and the like.

The intermediates used in the preparation of the compounds of the instant invention which are disclosed and claimed in the parent application Serial No. 606,796, now abandoned in favor of our continuation-in-part application Serial No. 724,784, were prepared preferably according to the procedure represented by the following series of equations where halogen, X, NB and R have the meanings given above and Hal is chloride, bromide or iodide:

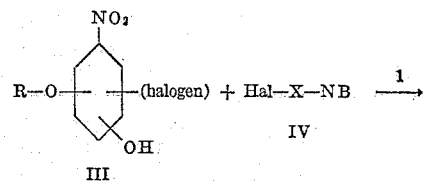

III      IV

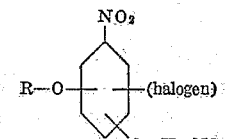

V

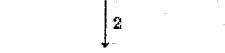

VI

In step 1 a halo-(lower-hydrocarbyloxy)-nitro-phenol (III) is converted into a halo-[lower-tertiary-amino(polycarbon-lower-alkoxy)] - (lower - hydrocarbyloxy) - nitrobenzene (V) by reaction with a tertiary-aminoalkyl halide (IV). In step 2 the tri-substituted-nitrobenzene (V) is reduced to yield the corresponding tri-substituted-aniline (VI). A specific illustration of this procedure is the formation of 3-bromo-4-(2-diethylaminoethoxy)-5-ethoxyaniline by reacting 2-bromo-4-nitro-6-ethoxyphenol, preferably in the form of an alkali metal salt, with a 2-diethylaminoethyl halide, preferably the chloride, to yield 3-bromo-4-(2-diethylaminoethoxy)-5-ethoxynitrobenzene, and reducing this tri-substituted-nitrobenzene to yield the corresponding 3-bromo-4-(2-diethylaminoethoxy)-5-ethoxyaniline.

Step 1 is carried out preferably using a halo-nitro-(lower-hydrocarbyloxy)phenol (III) in the form of a metal derivative, e.g., alkali metal, with a tertiary-aminoalkyl halide (IV). Alternatively, step 1 can be carried out using a halo-nitro-(lower-hydrocarbyloxy)phenol itself, however, with a resulting decrease in the yield of the tri-substituted-nitrobenzene (V).

The reduction step 2 is carried out preferably by chemical methods or, alternatively, by catalytic hydrogenation although this method is less desirable where the halo substituent is bromo or iodo. Suitable chemical reducing agents include iron and hydrochloric acid, ferrous sulfate and ammonia, tin and hydrochloric acid, sodium hydrosulfite, etc. In practicing our invention, we preferably used iron and hydrochloric acid. Catalysts suitable when catalytic hydrogenation is employed include Raney nickel, platinum, palladium or other catalysts generally effective to catalyze hydrogenation of nitro groups to amino groups.

Step 1 can also be carried out stepwise, that is, by first haloalkylating a halo-nitro-(lower-hydrocarbyloxy) phenol (III) to form a halo-haloalkoxy-hydrocarbyloxy-nitrobenzene which is then treated with a secondary amine having the formula HNB. The first step can be accomplished by reacting a halo-nitro-((lower-hydrocarbyloxy) phenol or a metal derivative thereof with a haloalkylating agent, preferably a haloalkyl ester of a strong inorganic acid or an organic sulfonic acid, such as a haloalkyl paratoluenesulfonate, haloalkyl benzenesulfonate, haloalkyl halide, and the like. As illustrations of this stepwise procedure, 2-chloro-4-nitro-6-n-propoxyphenol is haloalkylated by treating its potassium salt with 3-chloropropyl paratoluenesulfonate to form 3-chloro-4-(3-chloropropoxy)-5-n-propoxynitrobenzene which then is treated with dimethylamine or piperidine to form 3-chloro-4-(3-dimethylaminopropoxy)-5-n-propoxyaniline or 3-chloro-4-[3-(1-piperidyl)propoxy]-5-n-propoxyaniline, respectively.

The intermediate halo-(lower-hydrocarbyloxy)-nitrophenols (III) are generally old, as are various procedures for their preparation. In practicing our invention we prepared these intermediates where the halo substituent is chloro, bromo or iodo by reacting the corresponding (lower-hydrocarbyloxy)- nitrophenols with a halogenating agent, e.g., bromine, pyridinium bromide perbromide, sulfuryl chloride, chlorine, iodine monochloride, etc. Alternatively, these halo-(lower-hydrocarbyloxy)-nitrophenols can be prepared by nitrating a halo-(lower-hydrocarbyloxy)-phenol or by other published procedures that are well-known to the chemist (see Examples 1A and 2B). A method of preparing the fluoro-(lower-hydrocarbyloxy)-nitrophenols is afforded by diazotizing an amino-(lower-hydrocarbyloxy)-nitrophenol, reacting the diazonium salt with fluoroboric acid to form the diazonium fluoroborate, and heating the latter to form the desired fluoro-(lower-hydrocarbyloxy)- nitrophenol.

Also disclosed and claimed in this application are N-(lower-alkanoylated) derivatives of our halo-(lower hydrocarbyloxy)-[lower - tertiary-amino(polycarbon-lower-alkoxy)]-anilines and their acid addition salts. Preferred embodiments are the 3-halo-4-[lower-tertiary-amino(polycarbon-lower-alnoxy)]-5-(lower - alkoxy)-N-(lower - alkanoyl)anilines having in free base form the formula which corresponds to Formula II. These N-alkanoylated derivatives also have local anesthetic activity. They are prepared by reacting a halo-(lower-hydrocarbyloxy)-[lower - tertiary - amino(polycarbon - lower-alkoxy)]-aniline with a lower alkanoylating agent. The preferred embodiments are thus prepared by reacting a 3-halo-4-[lower-tertiary-amino(polycarbon-lower - alkoxy)] - 5-(lower-alkoxy)aniline with a lower alkanolyating agent such as a lower-alkanoic anhydride of the formula $(Ac)_2O$, a lower-alkanoyl halide of the formula Ac-halogen where halogen is preferably chloride, bromide or iodide, or, in the case of the formates, i.e., where Ac is HCO, the lower-alkanoylating agent is formic acid.

Our new halo-(lower-hydrocarbyloxy)-[lower-tertiary-amino(polycarbon-lower-alkoxy)]N - (lower - alkanoyl) aniline derivatives are useful in the free base form or in the form of acid addition salts, and both forms are within the purview of the invention. The acids which can be used to prepare acid addition salts are preferably those which produce, when combined with the free base, salts whose anions are relatively innocuous to the animal organism in therapeutic doses of the salts, so that the beneficial physiological properties inherent in the free base are not vitiated by side effects ascribable to the anions; in other words, the latter do not substantially affect the pharmacodynamic properties inherent in the cations. In practicing our invention, we found it convenient to employ the hydrochloride salts. However, other appropriate acid addition salts are those derived from mineral acids such as hydrobromic acid, hydriodic acid, nitric acid, phosphoric and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate or acid phosphate, sulfate or acid sulfate, acetate, citrate or acid citrate, tartrate or acid tartrate, lactate, quinate, methanesulfonate and ethanesulfonate salts, respectively.

The chemical structures of our halo-(lower-hydrocarbyloxy)-[lower - tertiary - amino(polycarbon-lower - alkoxy)]N-(lower-alkanoyl)anilines are established by their mode of synthesis and corroborated by the correspondence of calculated and found values for the elementary analyses for representative examples.

The following examples will further illustrate the invention without, however, limiting it thereto.

EXAMPLE 1

A. *Halo-Nitro-(Lower-Alkoxy)phenols*

As noted above, these compounds are generally old and various procedures for their preparation are given in the literature. One of these procedures is the reaction of a (lower-alkoxy)-nitrophenol with a halogenating agent. This method is illustrated by the following synthesis of 2-bromo-4-nitro-6-n-propoxyphenol: A solution of 4.9 g. of bromine in 75 ml. of acetic acid was added over a period of four hours to a stirred solution of 5.33 g. of 2-n-propoxy-4-nitrophenol in 40 ml. of acetic acid. The resulting solution was stirred on a steam bath for an additional two and one-half hours. The reaction mixture was then added to an ice-water mixture to yield a solid precipitate. This solid was collected and recrystallized once from ethanol-water and once from isopropanol to yield 2-bromo-4-nitro-6-n-propoxyphenol, M.P. 116.0–118.0° C. (corr.).

*Analysis.*—Calc'd. for $C_9H_{10}BrNO_4$: N, 5.07; Br, 28.94. Found: N, 5.05; Br, 29.03.

The intermediate 2-n-propoxy-4-nitrophenol was prepared from catechol (1,2-dihydroxybenzene) by first dipropylating catechol to form 1,2-di-n-propoxybenzene, nitrating this compound to yield 1,2-di-n-propoxy-4-nitrobenzene and then dealkylating the 1-ether. This three-step procedure is given as follows: *1,2-di-n-propoxybenzene.*—n-Propyl benzenesulfonate, 343.4 g., was added slowly under nitrogen at a temperature range of about 45 to 80° C. to a solution containing 188.9 g. of catechol, 111.5 g. of potassium hydroxide, 650 ml. of ethanol and 215 ml. of water. An additional 13 g. of potassium hydroxide in water was added after the reaction mixture had been refluxed for one hour; refluxing was then continued for a total of twelve hours. To the resulting solution was added 98.5 g. of potassium hydroxide in water, followed by the slow addition of 343.4 g. of n-propyl benzenesulfonate. After one hour of refluxing, an additional 15 g. of potassium hydroxide was added, and refluxing was continued for another eleven hours. The cooled mixture was separated and the water layer was extracted with ether. The ether extracts were combined, dried, and the ether removed by distillation in vacuo. Distillation of the residual material yielded 238.4 g. of 1,2-n-propoxybenzene, B.P. 142–148° C. at 30 mm. *1,2-di-n-propoxy-4-nitrobenzene.*—To a solution of 58 ml. of concentrated nitric acid in 220 ml. of acetic acid kept at about 5 to 10° C. was added slowly a solution of 84.3 g. of 1,2-di-n-propoxybenzene in 130 ml. of acetic acid. The reaction mixture was stirred at about 5–10° C. for about thirty minutes and then allowed to warm up to room temperature over a period of about three and one-half hours. The mixture was then added to ice-water and the solid that separated was collected and recrystallized from methanol-water to yield 97.2 g. of 1,2-di-n-propoxy14-nitrobenzene, M.P. 62.0–63.2° C. *2-n-propoxy-4-nitrophenol.*—A reaction mixture containing 29.1 g. of 1,2-di-n-propoxy-4-nitrobenzene, 58 g. of potassium hydroxide, 580 ml. of water and 580 ml. of ethylene glycol monomethyl ether was stirred under reflux for about five days. The mixture was evaporated to dryness in vacuo. About 350 ml. of water was added and the mixture was again evaporated to dryness. The residual material was suspended in about one liter of water, filtered, and the filtrate was acidified with concentrated hydrochloric acid. The acidic aqueous solution was extracted with ether, the ether extract evaporated by distilling in vacuo and the resulting residual material recrystallized from ethanol-water to yield 22.6 g. of crystalline 2-n-propoxy-4-nitrophenol, M.P. 81.5–82.5° C.

2-chloro-4-nitro-6-n-propoxyphenol is obtained by chlorinating 2-n-propoxy-4-nitrophenol using sulfuryl chloride as the chlorinating agent following the procedure given in Example 8A for the preparation of 2-chloro-4-nitro-6-methoxy-phenol.

Other halo-nitro-(lower-alkoxy)phenols that can be prepared following the above procedures given for the preparation of the 2-halo-4-nitro-6-n-propoxyphenols using the appropriate reactants are: 2-bromo-4-nitro-6-n-octoxyphenol by reacting 2-n-octoxy-4-nitrophenol with bromine; 2-nitro-4-bromo-5-isopropoxyphenol by reacting 2-nitro-5-isopropoxyphenol with bromine; 2-bromo-4-n-butoxy-6-nitrophenol by reacting 2-nitro-4-n-butoxyphenol with bromine; 2-n-propoxy-4-bromo-5-nitrophenol by reacting 2-n-propoxy-5-nitrophenol with bromine; 2-chloro-4-nitro-5-ethoxyphenol by reacting 3-ethoxy-4-nitrophenol with sulfuryl chloride; 2-iodo-4-nitro-6-n-propoxyphenol by reacting 2-n-propoxy-4-nitrophenol with iodine monochloride; and the like.

These intermediate halo-nitro-(lower-alkoxy)phenols also can be prepared by other known procedures such as nitration of halo-(lower-alkoxy)phenols, e.g., preparation of 2-nitro-3-chloro-5-methoxyphenol by nitrating 3-chloro-5-methoxyphenol (Hodgson and Batty, J. Chem. Soc., 1934, 1433), or reacting a halo-hydroxy-(lower-alkoxy)benzaldehyde with cold fuming nitric acid, e.g., preparation of 2-nitro-4-bromo-5-methoxyphenol by reacting 2-hydroxy-4-methoxy-5-bromobenzaldehyde with cold fuimng nitric acid (Srikantia et al., J. Chem. Soc., 1932, 524), or other procedures. Illustrative of the preparation of a fluoro-nitro-(lower-alkoxy)phenol is the formation of 2-fluoro-4-nitro-6-methoxyphenol by diazotizing 2-amino-4-nitro-6-methoxyphenol, reacting the resulting diazonium salt with fluoroboric acid to form the corresponding diazonium fluoroborate and heating the fluoroborate to form 2-fluoro-4-nitro-6-methoxyphenol. For other references to the synthesis of halo-nitro-(lower-alkoxy)phenols, see Examples 2A and 2B.

B. *Halo-(Lower-Alkoxy)-[Lower-Tertiary-Amino(Polycarbon-Lower-Alkoxy)]-Nitrobenzenes*

The preparation of these compounds is illustrated by the following preparation of 3-bromo-4-(2-diethylaminoethoxy)-5-n-propoxynitrobenzene: A solution of sodium ethoxide was obtained by reacting 0.5 g. of sodium with 20 ml. of absolute ethanol, adding 50 ml. of toluene and removing the excess ethanol by distillation. To this solution was added 6.1 g. of 2-bromo-4-nitro-6-n-propoxyphenol to convert it into its sodium salt. A solution of 2.98 g. of 2-diethylaminoethyl chloride in 50 ml. of toluene was added and the resulting reaction mixture was stirred under reflux for about eighty-seven hours under anhydrous conditions. The solid sodium chloride was filtered, the solvent removed by distilling in vacuo and the residual oily material, 3-bromo-4-(2-diethylaminoethoxy)-5-n-propoxynitrobenzene in its free base form, was taken up in ether and treated with excess ethereal hydrogen chloride to yield a light tan solid. This solid was dissolved in water and treated with aqueous potassium carbonate solution. The oily product that separated was taken up in ether and the ether solution treated with an excess of ethereal hydrogen chloride to yield the solid hydrochloride. This salt was recrystallized three times from ethanol-ether to yield in purified form, 3-bromo-4-(2-diethylaminoethoxy)-5-n-propoxynitrobenzene as its monohydrochloride salt, M.P. 148.6–151.2° C. (corr.).

*Analysis.*—Calcd. for $C_{15}H_{23}BrN_2O_4 \cdot HCl$: Cl⁻, 8.61; N, 6.80. Found Cl⁻, 8.61; N, 6.63.

Other halo-(lower-alkoxy)-[lower-tertiary-amino(polycarbon-lower-alkoxy)]-nitrobenzenes that can be prepared according to the foregoing procedure used for the preparation of 3-bromo-4-(2-diethylaminoethoxy)-5-n-propoxynitrobenzene using the appropriate halo-(lower-alkoxy)-nitrophenol and lower-tertiary-amino-(polycarbon-lower-alkyl) halide include: 3-bromo-4-(2-dimethylaminoethoxy)-5-n-propoxynitrobenzene using 2-bromo-4-nitro-6-n-propoxyphenol and 2-dimethylaminoethyl chloride; 3-chloro-4-(2-diethylaminoethoxy)-5-n-propoxynitrobenzene using 2-chloro-4-nitro-6-n-propoxyphenol and 2-diethylaminoethyl bromide; 3-bromo-4-(2-di-n-butylaminoethoxy)-5-n-propoxynitrobenzene using 2-bromo-4-nitro-6-n-propoxyphenol and 2-di-n-butylaminoethyl iodide; 3-bromo-4-(4-diethylaminobutoxy)-5-n-propoxynitrobenzene using 2-bromo-4-nitro-6-n-propoxyphenol and 4-diethylaminobutyl chloride; 3-bromo-4-[2-(N-methyl-N-ethyl)-aminoethoxy]-5-n-propoxynitrobenzene using 2-bromo-4-nitro-6-n-propoxyphenol and 2-(N-methyl-N-ethyl)aminoethyl chloride; 3-bromo-4-(3-diethylamino-2-propoxy)-5-n-propoxynitrobenzene using 2-bromo-4-nitro-6-n-propoxyphenol and 3-diethylamino-2-propyl chloride; 3-bromo-4-(2-diethylaminoethoxy)-5-n-octoxynitrobenzene using 2-bromo-4-nitro-6-n-octoxyphenol and 2-diethylaminoethyl chloride; 2-(2-diethylaminoethoxy)-4-isopropoxy-5-bromonitrobenzene using 2-nitro-4-bromo-5-isopropoxyphenol and 2-diethylaminoethyl chloride; 2-(2-diethylaminoethoxy)-3-bromo-5-n-butoxynitrobenzene using 2-bromo-4-n-butoxy-6-nitrophenol and 2-diethylaminoethyl chloride; 2-bromo-4-n-propoxy-5-[3-(1-piperidyl)propoxy]nitrobenzene using 2-n-propoxy-4-bromo-5-nitrophenol and 3-(1-piperidyl)propyl chloride; 2-ethoxy-4-[2-(3-ethyl-1-piperidyl)ethoxy]-5-chloronitrobenzene using 2-chloro-4-nitro-5-ethoxyphenol and 2-(3-ethyl-1-piperidyl)ethyl chloride; 2-chloro-4-methoxy-6-[3-(1-pyrrolidyl)propyl]nitrobenzene using 2-nitro-3-chloro-5-methoxyphenol and 3-(1-pyrrolidyl)propyl chloride; 2-[2-(2,5-dimethyl-1-pyrrolidyl)ethoxy]-4-methoxy-5-bromonitrobenzene using 2-nitro-4-bromo-5-methoxyphenol and 2-(2,5-dimethyl-1-pyrrolidyl)ethyl chloride; 3-iodo-4-(2-diethylaminoethoxy)-5-n-propoxynitrobenzene using 2-iodo-4-nitro-6-n-propoxyphenol and 2-diethylaminoethyl chloride; 3-fluoro-4-(2-diethylaminoethoxy)-5-methoxynitrobenzene using 2-fluoro-4-nitro-6-methoxyphenol and 2-diethylaminoethyl chloride; and the like. These basic esters can be isolated in free base form or in the form of their acid addition salts, preferably the hydrochlorides.

C. *Halo-(Lower-Alkoxy)-[Lower-Tertiary-Amino(Polycarbon-Lower-Alkoxy)]-Anilines*

The preparation of these compounds is illustrated by the following preparation of 3-bromo-4-(2-diethylaminoethoxy)-5-n-propoxyaniline: A solution containing 4.1 g. of 3-bromo-4-(2-diethylaminoethoxy)-5-n-propoxynitrobenzene monohydrochloride, 35 ml. of ethanol and 35 ml. of water was added slowly with stirring under an atmosphere of nitrogen to a refluxing mixture containing 3.3 g. of iron powder, 0.3 ml. of concentrated hydrochloric acid, 50 ml. of ethanol and 50 ml. of water. The reaction mixture was heated at reflux with stirring for an additional two hours. It was then made basic with sodium bicarbonate, the solid that separated was filtered, and the filter-cake was washed well with hot ethanol. The filtrate was evaporated to dryness in vacuo, the residue was dissolved in water, the resulting aqueous solution was made strongly basic with potassium hydroxide to liberate 3-bromo-4-(2-diethylaminoethoxy)-5-n-propoxyaniline which was taken up in ether. The ether solution was dried over anhydrous sodium sulfate, treated with decolorizing charcoal, and filtered. A slight excess of ethereal hydrogen chloride was added to the ether filtrate. The resulting precipitate was recrystallized from ethanol-ether to yield, as fine needles, the product, 3-bromo-4-(2-diethylaminoethoxy)-5-n-propoxyaniline in the form of its dihydrochloride salt, M.P. 146.4° C.—indefinite (corr.).

*Analysis.*—Calcd. for $C_{15}H_{25}BrN_2O_2 \cdot 2HCl$: Cl⁻, 16.96; C, 43.08; H, 6.51. Found: Cl⁻, 16.91; C, 42.92; H, 6.27.

Pharmacological evaluation of 3-bromo-4-(2-diethylaminoethoxy)-5-n-propoxyaniline dihydrochloride in aqueous solution administered intradermally in guinea pigs according to the method of Bulbring and Wajda [J. Pharmacol. and Exptl. Therap. 85, 78 (1945)] has shown that this compound (in terms of its free base) is approximately fifteen times as active a local anesthetic as procaine hydrochloride. Using the trypan blue irritation test procedure described by Hoppe et al. [J. Am. Pharm. Assoc. 39, 147 (1950)] as modified by Luduena and Hoppe [J. Pharm. and Exptl. Therap. 104, 40 (1952)], this compound was found to be only about four times as irritating as procaine hydrochloride.

Other halo-(lower-alkoxy)-[lower-tertiary-amino(polycarbon-lower-alkoxy)]-anilines that can be prepared according to the foregoing procedure used for the preparation of 3-bromo-4-(2-diethylaminoethoxy)-5-n-propoxyaniline using the corresponding halo-(lower-alkoxy)-[lower - tertiary - amino(polycarbon-lower-alkoxy)]-nitrobenzene include: 3-bromo-4-(2-dimethylaminoethoxy)-5-n-propoxyaniline, 3-chloro-4-(2-diethylaminoethoxy)-5-n-propoxyaniline, 3-bromo-4-(2-di-n-butylaminoethoxy)-5-n-propoxyaniline, 3-bromo-4-(4-diethylaminobutoxy)-5-n-propoxyaniline, 3-bromo-4-[2-(N-methyl-N-ethyl)-aminoethoxy]-5-n-propoxyaniline, 3-bromo-4-(3-diethylamino-2-propoxy)-5-n-propoxyaniline, 3-bromo-4-(2-diethylaminoethoxy)-5-n-octoxyaniline, 2-(2-diethylaminoethoxy)-4-isopropoxy-5-bromoaniline, 2-(2-diethylaminoethoxy) - 3-bromo - 5 - n-butoxyaniline, 2-bromo-4-n-propoxy-5-[3-(1-piperidy)propoxy]aniline, 2-ethoxy-4-[2-(3-ethyl - 1 - piperidyl)ethoxy] - 5-chloroaniline, 2-chloro-4-methoxy-6-[3-(1-pyrrolidyl)propyl]aniline, 2-[2-(2,5-dimethyl-1-pyrrolidyl)ethoxy]-4-methoxy-5 - bromoaniline, 3-iodo-4-(2-diethylaminoethoxy)-5-n-propoxyaniline, 3-fluoro-4-(2-diethylaminoethoxy)-5-methoxyaniline, and the like. These basic esters can be isolated in free base form or in the form of their acid addition salts, preferably the hydrochlorides.

EXAMPLE 2

A. *2-Bromo-4-Nitro-6-Methoxyphenol*

In practicing our invention we prepared this compound [Robertson, J. Chem. Soc. 93, 792 (1908)] by the procedure described in Example 1A for the preparation of the corresponding 2-bromo-4-nitro-6-n-propoxyphenol using 33.8 g. of 2-methoxy-4-nitrophenol, 300 ml. of acetic acid and 35.2 g. of bromine in 250 ml. of acetic acid. There was thus obtained 43.1 g. of 2-bromo-4-nitro-6-methoxyphenol, M.P. 159.7–160.3° C. This same tri-substituded-phenol was obtained by the slow addition of 8.0 g. of bromine in 100 ml. of methanol to 6.22 g. of the potassium salt of 2-methoxy-4-nitrophenol in 125 ml. of water to yield 3.03 g. of product. 2-bromo-4-nitro-6-methoxyphenol was also obtained using pyridinium bromide perbromide as the brominating agent, as follows: To a solution containing 8.5 g. of 2-methoxy-4-nitrophenol in 75 ml. of acetic acid and 0.6 ml. of 30% hydrogen bromide in acetic acid was added dropwise with stirring over a period of thirty minutes a hot solution containing 20.5 g. of pyridinium bromide perbromide and 4.51 g. of fused sodium acetate in 200 ml. of acetic acid. Stirring was continued for an additional forty minutes and the reaction mixture was then poured with stirring into two liters of an ice-water mixture. The precipitated product was collected and recrystallized from ethanol-water.

2-methoxy-4-nitrophenol was prepared starting with 1,2-dimethoxybenzene following the procedure given in Example 1A for the preparation of 2-n-propoxy-4-nitrophenol. Thus, 61.6 g. of 1,2-dimethoxy-4-nitrobenzene, M.P. 97.3–98.0° C., was obtained using 50 g. of 1,2-dimethoxybenzene in 50 ml. of acetic acid, 60 ml. of concentrated nitric acid and 100 ml. of water. 2-methoxy-4-nitrophenol, M.P. 100–100.5° C. was obtained in a yield of 3.9 g. using 5.0 g. of 1,2-dimethoxy-4-nitrobenzene, 10 g. of potassium hydroxide, 100 ml. of water and a reflux period of about fifteen hours.

B. *Halo-Methoxy-[Lower-tertiary-amino(polycarbon-LowerAlkoxy)]-Nitrobenzenes*

The preparation of these compounds is illustrated by the preparation of 3-bromo-4-(2-diethylaminoethoxy)-5-methoxy-nitrobenzene following the procedure given in Example 1B using 9.9 g. of 2-bromo-4-nitro-6-methoxyphenol, 0.9 g. of sodium, 20 ml. of ethanol, 75 ml. of toluene and 5.4 g. of 2-diethylaminoethyl chloride in 75 ml. of toluene. There was thus obtained 8.24 g. of 3 - bromo - 4 - (2 - diethylaminoethoxy) - 5 - methoxy-nitrobenzene in the form of its monohydrochloride, M.P. 170.4–172.6° C. (corr.).

*Analysis.*—Calcd. for $C_{13}H_{19}BrN_2O_4 \cdot HCl$: Cl⁻, 9.24; $N_{Ti}$, 3.65. Found: Cl⁻, 9.17; $N_{Ti}$, 3.63. ($N_{Ti}$ stands for nitro nitrogen as determined by titration with standard titanous chloride in glacial acetic acid solution.)

Other halo-methoxy - [lower-tertiary-amino(polycarbon-lower-alkoxy)]-nitrobenzenes that can be prepared according to the above procedure used for the preparation of 3-bromo-4-(2-diethylaminoethoxy) - 5 - methoxy-nitrobenzene using the appropriate halo-methoxy-nitrophenol and lower - tertiary - amino - (polycarbon- lower-alkyl) halide include: 3-bromo-4-[3-(1-piperidyl)propoxy]-5-methoxynitrobenzene using 2-bromo-4-nitro-6-methoxyphenol and 3-(1-piperidyl)propyl chloride; 2-(2-diethylaminoethoxy)-3-methoxy - 5 - bromonitrobenzene using 2-methoxy-4-bromo-6-nitrophenol [Robertson, J. Chem. Soc. 93, 791 (1908)] and 2-diethylaminoethyl bromide; 2-bromo - 3 - (2 - diethylaminoethoxy)-4-methoxynitrobenzene using 2-bromo-3-nitro-6-methoxyphenol [Jones and Robinson, J. Chem. Soc. 111, 917 (1916)] and 2-diethylaminoethyl chloride; 2-bromo-4-methoxy-5-(2-diethylaminoethoxy)nitrobenzene using 2-methoxy-4-bromo-5-nitrophenol [Raiford and Silker, J. Org. Chem. 2, 346 (1937)] and 2-diethylaminoethyl chloride; 2-[2-(1-pyrrolidyl)ethoxy]-3-chloro-6-methoxynitrobenzene using 2-nitro-3-methoxy-6-chlorophenol [Meldola and Eyre, J. Chem. Soc. 81, 999 (1902)] and 2-(1-pyrrolidyl)ethyl chloride; 2-methoxy-4-chloro-6-(2-diethylaminoethoxy)nitrobenzene using 2-nitro-3-methoxy-5-chlorophenol (Hodgson and Batty, J. Chem. Soc. 1934, 1433) and 2-diethylaminoethyl chloride; 2-chloro-4-methoxy-6-(2-diethylaminoethoxy)nitrobenzene using 2-nitro-3-chloro-5-methoxyphenol (Hodgson and Wignall, J. Chem. Soc. 1928, 329) and 2-diethylaminoethyl chloride; 2-(2-diethylaminoethoxy)-4-methoxy-5-bromonitrobenzene using 2-nitro-4-bromo-5-methoxyphenol (Hodgson and Dyson, J. Chem. Soc. 1935, 946) and 2-diethylaminoethyl chloride; 2-(2-diethylaminoethoxy)-4-methoxy-5-chloronitrobenzene using 2-nitro-4-chloro-5-methoxyphenol [Beilstein, 6 (404)] and 2-diethylaminoethyl chloride; 2-methoxy-4-bromo-5-(2-diethylaminoethoxy)nitrobenzene using 2-bromo-4-methoxy-5-nitrophenol and 2-diethylaminoethyl chloride; 2-(2-diethylaminoethoxy)-4-methoxy-5-iodonitrobenzene using 2-nitro-4-iodo-5-methoxyphenol [Stephens, J. Chem. Soc. 87, 1201 (1905)] and 2-diethylaminoethyl chloride; 2-(2-diethylaminoethoxy)-3-iodo-6-methoxynitrobenzene using 2-nitro-3-methoxy-6-iodophenol [Meldola and Hay, J. Chem. Soc. 91, 1484 (1907)] and 2-diethylaminoethyl chloride; and the like.

C. Halo-Methoxy-[Lower-Tertiary-Amino(Polycarbon-Lower-Alkoxy)]-Anilines

The preparation of these compounds is illustrated by the preparation of 3-bromo-4-(2-diethylaminoethoxy)-5-methoxyaniline following the procedure given in Example 1C using 23.0 g. of 3-bromo-4-(2-diethylaminoethoxy)-5-methoxynitrobenzene hydrochloride, 420 ml. of a mixture containing equal parts of ethanol and water, 19.9 g. of iron powder and 1.5 ml. of hydrochloric acid in 600 ml. of a 1:1 ethanol-water mixture. There was thus obtained 23.3 g. of 3-bromo-4-(2-diethylaminoethoxy)-5-methoxyaniline in the form of its dihydrochloride, M.P. 175–180° C. Since this dihydrochloride was found in an earlier experiment to lose part of an equivalent of hydrogen chloride on drying, it was converted into the monohydrochloride by first converting more than half of the dihydrochloride salt to the free base by treating its aqueous solution with alkali and extracting the basic ether with ether or ethyl acetate, and adding the remaining dihydrochloride salt in absolute ethanol solution. The precipitated mono-salt was collected and recrystallized from ethanol-ether to yield 15.4 g. of 3-bromo-4-(2-diethylaminoethoxy)-5-methoxyaniline monohydrochloride, M.P. 220.8–224.6° C. (corr.).

Analysis.—Calcd. for $C_{13}H_{21}BrN_2O_2 \cdot HCl$: C, 44.14; H, 6.27; Cl−, 10.02. Found: C, 44.24; H, 6.36; Cl−, 10.02.

Pharmacological evaluation of 3-bromo-4-(2-diethylaminoethoxy)-5-methoxyaniline monohydrochloride according to the procedures referred to in Example 1C has shown that this compound (in terms of its base) is approximately three times as active a local anesthetic as procaine hydrochloride and is about one and one-half times as irritating.

Other halo-methoxy-[lower-tertiary-amino(polycarbon-lower-alkoxy)]-anilines that can be prepared according to the foregoing procedure used for the preparation of 3-bromo-4-(2-diethylaminoethoxy)-5-methoxyaniline using the corresponding halo-methoxy-[lower-tertiary-amino(polycarbon-lower-alkoxy)]-nitrobenzene include:

3-bromo-4-[3-(1-piperidyl)propoxy]-5-methoxyaniline,
2-(2-diethylaminoethoxy)-3-methoxy-5-bromoaniline,
2-bromo-3-(2-diethylaminoethoxy)-4-methoxyaniline,
2-bromo-4-methoxy-5-(2-diethylaminoethoxy)aniline,
2-[2-(1-pyrrolidyl)ethoxy]-3-chloro-6-methoxyaniline,
2-methoxy-4-chloro-6-(2-diethylaminoethoxy)aniline,
2-chloro-4-methoxy-6-(2-diethylaminoethoxy)aniline,
2-(2-diethylaminoethoxy)-4-methoxy-5-bromoaniline,
2-(2-diethylaminoethoxy)-4-methoxy-5-chloroaniline,
2-methoxy-4-bromo-5-(2-diethylaminoethoxy)aniline,
2-(2-diethylaminoethoxy)-4-methoxy-5-iodoaniline,
2-(2-diethylaminoethoxy)-3-iodo-6-methoxyaniline, and the like. These basic ethers can be isolated in free base form or in the form of their acid addition salts, preferably the monohydrochlorides.

EXAMPLE 3

A. 2-Bromo-4-Nitro-6-Ethoxyphenol

This compound was prepared following the procedure described in Example 1A for the preparation of the corresponding 2-bromo-4-nitro-6-n-propoxyphenol using 36.6 g. of 2-ethoxy-4-nitrophenol, 250 ml. of acetic acid and 35.2 g. of bromine in 160 ml. of acetic acid. There was thus obtained 39.5 g. of 2-bromo-4-nitro-6-ethoxyphenol, M.P. 160.2–161.8° C. (corr.).

Analysis.—Calcd. for $C_8H_8BrNO_4$: N, 5.34; Br, 30.50. Found: N, 5.32; Br, 30.85.

2-ethoxy-4-nitrophenol was prepared starting with catechol following the procedure given in Example 1A for the preparation of 2-n-propoxy-4-nitrophenol. 1,2-diethoxybenzene was prepared as follows: To a solution of 220.2 g. of catechol, 171.5 g. of sodium hydroxide and one liter of water was added slowly under nitrogen with rapid stirring at about 10° C. 524 ml. of diethyl sulfate. The resulting suspension was allowed to warm up to room temperature, taking about four hours, and was then heated to about 70–80° C. for an additional two and one-half hours. The mixture was steam distilled, the distillate chilled and the precipitate collected. The precipitate was recrystallized from methanol-water, yielding 207.1 g. of 1,2-diethoxybenzene, M.P. 41.3–42.1° C. A yield of 240.1 g. of 1,2-diethoxy-4-nitrobenzene, M.P. 72.0–73.4° C., was obtained using 199.5 g. of 1,2-diethoxybenzene in 400 ml. of acetic acid and 190 ml. of concentrated nitric acid in a mixture of 330 ml. of water and 250 ml. of acetic acid. 2-ethoxy-4-nitrophenol, M.P. 95.5–97.5° C., was obtained in a yield of 50.5 g. using 63.3 g. of 1,2-diethoxy-4-nitrobenzene, 127 g. of potassium hydroxide, 800 ml. of water, 800 ml. of ethylene glycol monomethyl ether and a reflux period of about three days.

B. 3-Bromo-4-(2-Diethylaminoethoxy)-5-ethoxynitrobenzene

The preparation of this compound was carried out following the procedure given in Example 1B using 13.1 g. of 2-bromo-4-nitro-6-ethoxyphenol, 1.2 g. of sodium, 25 ml. of ethanol, 75 ml. of toluene and 6.8 g. of 2-diethylaminoethyl chloride in 70 ml. of toluene. There was thus obtained 15.8 g. of 3-bromo-4-(2-diethylaminoethoxy)-5-ethoxynitrobenzene in the form of its monohydrochloride, M.P. 167.0–168.2° C. (corr.).

Analysis.—Calcd. for $C_{14}H_{21}BrN_2O_4 \cdot HCl$: Cl−, 8.92; $N_{Tb}$, 3.53. Found: Cl−, 8.90; $N_{Tb}$, 3.32.

C. 3-Bromo-4-(2-Diethylaminoethoxy)-5-Ethoxyaniline

This preparation was carried out following the procedure described in Example 1C using 23.9 g. of 3-bromo-4-(2-diethylaminoethoxy)-5-ethoxynitrobenzene hydrochloride, 420 ml. of a mixture containing equal parts of ethanol and water, 19.9 g. of iron powder and 1.5 ml. of hydrochloric acid in 600 ml. of a 1:1 ethanol-water mixture. There was thus obtained 22.3 g. of 3-bromo-4-(2-diethylaminoethoxy)-5-ethoxyaniline in the form of its dihydrochloride salt, M.P. 148–168° C. The dihydrochloride was converted as above into 16.0 g. of the corresponding monohydrochloride salt, M.P. 169.0–173.4° C. (corr.).

Analysis.—Calcd. for $C_{14}H_{23}BrN_2O_2 \cdot HCl$: C, 45.73; H, 6.58; Cl−, 9.64. Found: C, 45.43; H, 6.58; Cl−, 9.78.

Pharmacological evaluation of 3-bromo-4-(2-diethylaminoethoxy)-5-ethoxyaniline dihydrochloride according to the procedures referred to in Example 1C has shown that this compound (in terms of its base) is approximately six times as active a local anesthetic as procaine hydrochloride and is about four times as irritating.

EXAMPLE 4

A. *2-Bromo-4-Nitro-6-n-Butoxyphenol*

This compound was prepared following the procedure described in Example 1A for the preparation of the corresponding 2-bromo-4-nitro-6-n-propoxyphenol using 8.8 g. of 2-n-butoxy-4-nitrophenol, 80 ml. of acetic acid and 7.4 g. of bromine in 90 ml. of acetic acid. There was thus obtained 5.9 g. of 2-bromo-4-nitro-6-n-butoxyphenol, M.P. 97.2–98.4° C. (corr.).

*Analysis.*—Calcd. for $C_{10}H_{12}BrNO_4$: N, 4.83; Br, 27.53. Found: N, 4.87; Br. 27.38.

2-n-butoxy-4-nitrophenol was prepared starting with catechol following the procedure given in Example 1A for the preparation of 2-n-propoxy-4-nitrophenol. 1,2-di-n-butoxybenzene, B.P. 149–152° C. at 16 mm., was prepared using 154.2 g. (one portion) of n-butyl benzenesulfonate, 39.6 g. of catechol, 46.9 g. of potassium hydroxide, 270 ml. of ethanol, 90 ml. of water and an extra 5.0 g. portion of potassium hydroxide; the yield was 50.1 g. 1,2-di-n-butoxy-4-nitrobenzene, M.P. 51.5–53.0° C., was obtained in a yield of 58.0 g. using 50.1 g. of 1,2-di-n-butoxybenzene in 65 ml. of acetic acid and 30.1 ml. of concentrated nitric acid in 115 ml. of acetic acid. 2-n-butoxy-4-nitrophenol, M.P. 38–39° C., was obtained in a yield of 9.0 g. using 13.1 g. of 1,2-di-n-butoxy-4-nitrobenzene, 26 g. of potassium hydroxide, 260 ml. of water, 260 ml. of ethylene glycol monomethyl ether and a reflux period of about four days.

B. *3-Bromo-4-(2-Diethylaminoethoxy)-5-n-Butoxy nitrobenzene*

This preparation was carried out following the procedure given in Example 1B using 14.5 g. of 2-bromo-4-nitro-6-n-butoxyphenol, 1.2 g. of sodium, 50 ml. of ethanol, 100 ml. of toluene and 6.8 g. of 2-diethylaminoethyl chloride in 140 ml. of toluene. There was thus obtained 15.4 g. of 3-bromo-4-(2-diethylaminoethoxy)-5-n-butoxynitrobenzene in the form of its monohydrochloride, M.P. 98.2–100.0° C. (corr.).

*Analysis.*—Calcd. for $C_{16}H_{25}BrN_2O_4 \cdot HCl$: N, 6.58; Cl⁻, 8.33. Found: N, 6.84; Cl⁻ 8.24.

C. *3-Bromo-4-(2-Diethylaminoethoxy)-5-n-Butoxyaniline*

This preparation was carried out following the procedure described in Example 1C using 5.5 g. of 3-bromo-4-(2-diethylaminoethoxy)-5-n-butoxynitrobenzene hydrochloride, 90 ml. of a 1:1 mixture of ethanol-water, 4.4 g. of iron powder and 0.4 ml. of hydrochloric acid in 130 ml. of a 1:1 mixture of ethanol-water. There resulted a yield of 5.0 g. of 3-bromo-4-(2-diethylaminoethoxy)-5-n-butoxyaniline in the form of its dihydrochloride salt, M.P. 171.0–190.6° C. (corr.).

*Analysis.*—Calcd. for $C_{16}H_{27}BrN_2O_2 \cdot 2HCl$: C, 44.46; H, 6.77; Cl⁻, 16.41. Found: C, 44.61; H, 6.88; Cl⁻, 16.29.

Pharmacological evaluation of 3-bromo-4-(2-diethylaminoethoxy)-5-butoxyaniline dihydrochloride according to the procedures referred to in Example 1C has shown that this compound (in terms of its base) is approximately twenty-two times as active a local anesthetic as procaine hydrochloride and is about nine times as irritating.

EXAMPLE 5

A. *2-Bromo-4-Nitro-6-n-Hexoxyphenol*

This compound was prepared following the procedure described in Example 2A for the preparation of the corresponding 2-bromo-4-nitro-6-methoxyphenol using 2.2 g. of the potassium salt of 2-n-hexoxy-4-nitrophenol in 45 ml. of acetic acid, and a mixture of 3.27 g. of pyridinium bromide perbromide and 0.2 ml. of 30% HBr in acetic acid in 45 ml. of acetic acid. There was thus obtained 1.79 g. of 2-bromo-4-nitro-6-n-hexoxyphenol, M.P. 84.2–88.2° C. (corr.).

*Analysis.*—Calcd. for $C_{12}H_{16}BrNO_4$: N, 4.40; Br, 25.12. Found: N, 4.37; Br, 24.90.

2-n-hexoxy-4-nitrophenol was prepared starting with catechol following the procedure given in Example 1A for the preparation of 2-n-propoxy-4-nitrophenol. 1,2-di-n-hexoxybenzene, B.P. 182–185° C. at 10 mm., was obtained in a yield of 33.8 g. using 116.3 g. (one portion) of n-hexyl benzenesulfonate, 22.0 g. of catechol, 26.1 g. of potassium hydroxide, 150 ml. of ethanol, 50 ml. of water and an extra 9.8 portion of potassium hydroxide. A yield of 39.4 g. of 1,2-di-n-hexoxy-4-nitrobenzene, M.P. 48–50° C., was obtained using 36.1 g. of 1,2-di-n-hexoxybenzene in 40 ml. of acetic acid and 17.3 ml. of concentrated nitric acid in 65 ml. of acetic acid. 2-n-hexoxy-4-nitrophenol was obtained as a red-brown oil using 5.0 g. of 1,2-di-n-hexoxy-4-nitrobenzene, 25 g. of potassium hydroxide, 100 ml. of water, 100 ml. of ethylene glycol monoethyl ether and a reflux period of over five days; the yield was 2.73 g. of product.

B. *3-Bromo-4-(2-Diethylaminoethoxy)-5-n-Hexoxynitrobenzene*

This preparation was carried out following the procedure given in Example 1B using 8.0 g. of 2-bromo-4-nitro-6-n-hexoxyphenol, 0.6 g. of sodium, 40 ml. of ethanol, 100 ml. of toluene and 3.4 g. of 2-diethylaminoethyl chloride in 20 ml. of toluene. The yield was 8.2 g. of 3-bromo-4-(2-diethylaminoethoxy)-5-n-hexoxynitrobenzene in the form of its monohydrochloride, M.P. 127.6–129.0° C. (corr.).

*Analysis.*—Calcd. for $C_{18}H_{29}BrN_2O_4 \cdot HCl$: $N_{Tl}$, 3.09; Cl⁻, 7.83. Found: $N_{Tl}$, 3.04; Cl⁻ 7.76.

Following the above procedure using an equivalent quantity of 2-bromo-4-nitro-6-n-amoxyphenol or 2-bromo-4-nitro-6-isoamoxyphenol in place of 2-bromo-4-nitro-6-n-hexoxyphenol, there is obtained in the form of the monohydrochloride salt 3-bromo-4-(2-diethylaminoethoxy)-5-n-amoxynitrobenzene or 3 - bromo - 4 - (2 - diethylaminoethoxy)-5-isoamoxynitrobenzene, respectively.

C. *3-Bromo-4-(2-Diethylaminoethoxy)-5-n-Hexoxyaniline*

This preparation was carried out following the procedure described in Example 1C using 6.1 g. of 3-bromo-4-(2-diethylaminoethoxy)-5-n-hexoxynitrobenzene hydrochloride, 95 ml. of a 1:1 mixture of ethanol-water, 4.6 g. of iron powder and 0.4 ml. of hydrochloric acid in 135 ml. of a 1:1 ethanol-water mixture. There was thus obtained 5.0 g. of 3-bromo-4-(2-diethylaminoethoxy)-5-n-hexoxyaniline in the form of its dihydrochloride salt, M.P. 193.0–196.0° C. (corr.).

*Analysis.*—Calcd. for $C_{18}H_{31}BrN_2O_2 \cdot 2HCl$: C, 46.97; H, 7.21; Cl⁻, 15.41. Found: C, 47.13; H, 7.56; Cl⁻ 15.36.

Pharmacological evaluation of 3-bromo-4-(2-diethylaminoethoxy)-5-n-hexoxyaniline dihydrochloride according to the procedure referred to in Example 1C has shown that this compound (in terms of its base) is approximately thirty-nine times as active a local anesthetic as procaine hydrochloride.

Following the above procedure using 3-bromo-4-(2-diethylaminoethoxy)-5-n - amoxynitrobenzene hydrochloride or 3-bromo-4-(2-diethylaminoethoxy)-5 - isoamoxynitrobenzene hydrochloride, there is obtained in the form of the dihydrochloride 3-bromo-4-(2-diethylaminoethoxy)-5-n-amoxyaniline or 3-bromo-4-(2-diethylaminoethoxy)-5-isoamoxyaniline, respectively.

EXAMPLE 6

A. *2-Bromo-4-Nitro-6-Benzyloxyphenol*

This compound was prepared following the procedure described in Example 2A for the preparation of the corresponding 2-bromo-4-nitro-6-methoxyphenol using 24.5 g. of 2-benzyloxy-4-nitrophenol, 3 ml. of 30% HBr in acetic acid, 40.9 g. of pyridinium bromide perbromide, 8.2 g. of fused sodium acetate and 700 ml. of acetic acid. There was thus obtained 20.2 g. of 2-bromo-4-nitro-6-benzyloxyphenol, M.P. 126.0–134.4° C. (corr.).

*Analysis.*—Calcd. for $C_{13}H_{10}BrNO_4$: N, 4.32; Br, 24.66. Found: N, 4.04; Br, 24.95.

2-benzyloxy-4-nitrophenol was prepared starting with catechol using the procedure given in Example 1A for the preparation of 2-n-propoxy-4-nitrophenol. 1,2-dibenzyloxybenzene was prepared as follows: A mixture containing 278.2 g. of benzyl chloride, 110.1 g. of catechol, 148.5 g. of sodium carbonate, 16.6 g. of potassium iodide, 8 ml. of water (used to dissolve the potassium iodide), and 900 ml. of ethanol was stirred at reflux under an atmosphere of nitrogen for about twelve hours. The warm suspension was filtered and the filter cake washed well with hot absolute ethanol. The combined filtrates were evaporated to a volume of about 400 ml., chilled and the precipitate that separated was collected and recrystallized from ethanol to yield 130.3 g. of 1,2-dibenzyloxybenzene, M.P. 58–59° C. 1,2-dibenzyloxy-4-nitrobenzene, M.P. 98.8–99.5° C., was obtained using 116.1 g. of 1,2-dibenzyloxybenzene in 600 ml. of acetic acid and 53.4 ml. of concentrated nitric acid in 650 ml. of acetic acid; the yield was 124.6 g. 2-benzyloxy-4-nitrophenol, M.P. 80.2–82.0° C., was obtained in a yield of 42.9 g. using 100.6 g. of 1,2-dibenzyloxy-4-nitrobenzene, 201 g. of potassium hydroxide, 1800 ml. of water, 1800 ml. of ethylene glycol monomethyl ether and a reflux period of about forty hours.

B. *3-Bromo-4-(2-Diethylaminoethoxy)-5-Benzyloxy-nitrobenzene*

This preparation was carried out following the procedure given in Example 1B using 16.2 g. of 2-bromo-4-nitro-6-benzyloxyphenol, 1.2 g. of sodium, 50 ml. of ethanol, 100 ml. of toluene and 6.8 g. of 2-diethylaminoethyl chloride in 40 ml. of toluene. There was thus obtained 20.9 g. of 3-bromo-4-(2-diethylaminoethoxy)-5-benzyloxynitrobenzene in the form of its monohydrochloride, M.P. 165.8–167.0° C. (corr.).

*Analysis.*—Calcd. for $C_{19}H_{23}BrN_2O_4 \cdot HCl$: $N_{Ti}$, 3.05; Cl⁻, 7.72. Found: $N_{Ti}$ 2.99; Cl⁻, 7.69.

C. *3-Bromo-4-(2-Diethylaminoethoxy)-5-Benzyloxy-aniline*

This preparation was carried out following the procedure described in Example 1C using 4.6 g. of 3-bromo-4-(2-diethylaminoethoxy)-5-benzyloxynitrobenzene hydrochloride, 70 ml. of a 1:1 mixture of ethanol-water, 3.3 g. of iron powder and 0.30 ml. of hydrochloric acid in 100 ml. of a 1:1 mixture of ethanol-water. There was thus obtained 4.0 g. of 3-bromo-4-(2-diethylaminoethoxy)-5-benzyloxyaniline in the form of its dihydrochloride salt, M.P. 223.2–224.6° C. (corr.).

*Analysis.*—Calcd. for $C_{19}H_{25}BrN_2O_2 \cdot 2HCl$: C, 48.94; H, 5.84; Cl⁻, 15.21. Found: C, 49.04; H, 5.92; Cl⁻, 15.11.

Pharmacological evaluation of 3-bromo-4-(2-diethylaminoethoxy)-5-benzyloxyaniline dihydrochloride according to the procedure referred to in Example 1C has shown that this compound (in terms of its base) is approximately nine times as active a local anesthetic as procaine hydrochloride and is about eleven times as irritating.

EXAMPLE 7

*Halo-(Lower-Alkoxy)-[Lower-Tertiary-Amino(Poly-carbon-Lower-Alkoxy)]-N-Acylated-Anilines*

The preparation of these compounds is illustrated by the following synthesis of 3-bromo-4-(2-diethylaminoethoxy)-5-ethoxyacetanilide: A mixture containing 3.7 g. of 3-bromo-4-(2-diethylaminoethoxy)-5 - ethoxyaniline monohydrochloride, 80 ml. of pyridine and 4.17 ml. of acetic anhydride was refluxed for about thirty minutes. About one-half of the solvent was removed by distilling in vacuo, ether was added, and the precipitate that separated was collected. Recrystallization of this material from ethanol-ether yielded 3.7 g. of 3-bromo-4-(2-diethylaminoethoxy)-5 - ethoxyacetanilide monohydrochloride, M.P. 161.7–164.0° C. (corr.).

*Analysis.*—Calcd. for $C_{16}H_{25}BrN_2O_3 \cdot HCl$: C, 46.90; H, 6.40; Cl⁻, 8.65. Found: C, 46.61; H, 6.33; Cl⁻, 8.37.

3-bromo-4-(2-diethylaminoethoxy)-5-ethoxyacetanilide in free base form is obtained by dissolving the hydrochloride in water, making the aqueous solution alkaline with sodium hydroxide solution, extracting the liberated base with benzene and removing the benzene by distilling the extract in vacuo. Alternatively, this basic ether can be prepared directly by acetylating 3-bromo-4-(2-diethylaminoethoxy)-5-ethoxyaniline in free base form following the above procedure used in acetylating its monohydrochloride.

Pharmacological evaluation of 3-bromo-4-(2-diethylaminoethoxy)-5-ethoxyacetanilide hydrochloride according to the procedure referred to in Example 1C has shown that this compound (in terms of its base) is approximately one-half as active a local anesthetic as procaine hydrochloride.

Following the above procedure but using propanoic anhydride, n-hexanoyl chloride, or formic acid as the acylating agent in place of acetic anhydride, the resulting compounds are obtained: 3-bromo-4-(2-diethylaminoethoxy)-5-ethoxy-N-(n-propanoyl)aniline, 3-bromo-4-(2-diethylaminoethoxy)-5-ethoxy-N-(n-hexanoyl)aniline, or 3-bromo-4-(2-diethylaminoethoxy)-5-ethoxy-N - formylaniline, respectively. These basic ethers can be isolated in free base form or in the form of their acid addition salts, preferably the hydrochlorides.

EXAMPLE 8

A. *2-Chloro-4-Nitro-6-Methoxyphenol*

A mixture containing 12.6 g. of 2-methoxy-4-nitrophenol and 65 ml. of sulfonyl chloride was refluxed for three hours under anhydrous conditions. The excess sulfuryl chloride was decomposed by cautious addition of ethanol and the resulting solution was added to water. The solid that separated was collected and recrystallized from ethanol-water to yield a crystalline material melting over a wide range, indicating incomplete chlorination. The crystalline material was dissolved in 160 ml. of chloroform; 65 ml. of sulfuryl chloride was added; and the mixture was refluxed four hours. The reaction mixture was concentrated by distillation to a volume of about 150 ml. and an equal volume of hot water was added. The resulting precipitate was collected and recrystallized once from ethanol-water and once from isopropanol to yield 3.02 g. of tan crystalline product, 2-chloro-4-nitro-6-methoxyphenol, M.P. 146–148.9° C.

*Analysis.*—Calcd. for $C_7H_6ClNO_4$: Cl, 17.43. Found: Cl, 16.90.

B. *3-Chloro-4-(2-Diethylaminoethoxy)-5-Methoxy-nitrobenzene*

This preparation is carried out following the procedure given in Example 2B using an equivalent quantity of 2-chloro-4-nitro-6-methoxyphenol in place of 2-bromo-4-nitro-6-methoxyphenol. The product thus obtained is 3-chloro - 4 - (2 - diethylaminoethoxy)-5-methoxynitrobenzene in the form of its monohydrochloride.

C. *3-Chloro-4-(2-Diethylaminoethoxy)-5-Methoxyaniline*

This preparation is carried out following the procedure given in Example 2C using an equivalent quantity of 3-chloro-4-(2-diethylaminoethoxy) - 5 - methoxynitrobenzene monohydrochloride in place of the corresponding 3-bromo compound. The product thus obtained is 3-chloro-4-(2-diethylaminoethoxy)-5-methoxyaniline in the form of its monohydrochloride.

Our halo-(lower-alkoxy)-[lower-tertiary-amino(poly-carbon-lower-hydrocarbyloxy)] - N - (lower - alkanoyl) aniline derivatives can be formulated in the manner conventional for local anesthetics. For example, they can be conveniently used as their acid addition salts, e.g., hydrochlorides, in aqueous liquid preparations. These preparations can be administered topically or injected intramuscularly or intravenously. Our compounds can also be advantageously combined with other pharmacologically active compounds, e.g., vasoconstrictor agents.

We claim:
1. A 3-halo-4-(dialkylaminoalkoxy)-5-alkoxy-N-acyl-aniline having the formula

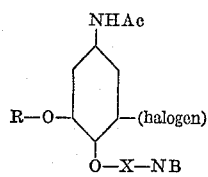

where R is a lower-alkyl radical having from one to eight carbon atoms inclusive, X is a lower-alkylene radical having from two to four carbon atoms inclusive and having its two free valence bonds on different carbon atoms, NB is a di-(lower-alkyl)amino radical, and Ac is a lower-alkanoyl radical having from one to six carbon atoms inclusive.

2. A pharmacologically acceptable acid addition salt of the compound of claim 1.
3. 3-bromo - 4 - (2-diethylaminoethoxy)-5-ethoxyacet-anilide.
4. 3-bromo - 4 - (2-diethylaminoethoxy)-5-ethoxyacet-anilide monohydrochloride.

References Cited in the file of this patent
UNITED STATES PATENTS

| | | |
|---|---|---|
| 2,359,227 | Livak et al. | Sept. 26, 1944 |
| 2,921,961 | Mueller et al. | Jan. 19, 1960 |

FOREIGN PATENTS

| | | |
|---|---|---|
| 742,819 | Great Britain | Jan. 4, 1956 |

OTHER REFERENCES

Bosshand: Chem. Abst., vol. 40 (1946), page 872.
Karrer: Organic Chemistry, Elsevier Publishing Co., Inc. (N.Y.), page 119 (1946).
Beilstein: Vol. 13, 2nd Supplement (1950), page 247.
Ekstrand et al.: Chemical Abstracts, 46, pages 9595–9596 (1952).
Herbst et al.: Journal of Organic Chemistry, vol. 17, pages 595–599 (1952).

UNITED STATES PATENT OFFICE
CERTIFICATE OF CORRECTION

Patent No. 3,076,845                                February 5, 1963

Raymond O. Clinton et al.

It is hereby certified that error appears in the above numbered patent requiring correction and that the said Letters Patent should read as corrected below.

Column 1, line 13, for "analine" read -- aniline --; line 18, for "823,784" read -- 824,784 --; column 2, lines 24 and 25, for "2-ethyl-1-piperidyl)," read -- 3-ethyl-1-piperidyl, --; lines 37 and 38, strike out "kylated)-1-piperidyl such as 2-methyl-1-piperidyl, 3-ethyl-1-piperidyl, 4-methyl-1-piperidyl, 2,6-dimethyl-1-piper-"; line 39, for "724,784" read -- 824,784 --; column 3, line 34, for "halo-nitro-((lower-" read -- halo-(lower- --; lines 70 and 71, for "(polycarbon-lower-alnoxy)" read -- (polycarbon-lower-alkoxy) --; column 5, line 12, for "1,2-n-" read -- 1,2-di-n- --; line 23, for "1,2-di-n-propoxy14-" read -- 1,2-di-n-propoxy-4- --; same column 5, line 66, for "fuimng" read -- fuming --; column 14, line 38, for "sulfonyl" read -- sulfuryl --.

Signed and sealed this 31st day of December 1963.

(SEAL)
Attest:
ERNEST W. SWIDER

Attesting Officer

EDWIN L. REYNOLDS
                                       Acting Commissioner of
                                                 Patents